(12) United States Patent
Marcos Montes et al.

(10) Patent No.: US 10,279,923 B2
(45) Date of Patent: May 7, 2019

(54) CONTACT DETECTING SYSTEM AND METHOD FOR AIR REFUELING TANKER EQUIPPED WITH AIR REFUELING BOOM SYSTEM

(71) Applicant: Airbus Defence and Space S.A., Getafe (ES)

(72) Inventors: Jose Luis Marcos Montes, Getafe (ES); Francisco Jose Lagares Carrasco, Getafe (ES); Guillaume Angibaud, Getafe (ES)

(73) Assignee: AIRBUS DEFENCE AND SPACE S.A., Getafe (ES)

( * ) Notice: Subject to any disclaimer, the term of this patent is extended or adjusted under 35 U.S.C. 154(b) by 420 days.

(21) Appl. No.: 15/138,724

(22) Filed: Apr. 26, 2016

(65) Prior Publication Data
US 2016/0311554 A1    Oct. 27, 2016

(30) Foreign Application Priority Data
Apr. 27, 2015 (EP) .................................. 15382209

(51) Int. Cl.
*B64D 39/04* (2006.01)
*B64D 39/06* (2006.01)

(52) U.S. Cl.
CPC ............. *B64D 39/04* (2013.01); *B64D 39/06* (2013.01)

(58) Field of Classification Search
CPC .......... B64D 39/00; B64D 39/04; B64D 39/06
USPC .......................................... 244/135 A, 135 R
See application file for complete search history.

(56) References Cited

U.S. PATENT DOCUMENTS

| 3,917,196 | A | * | 11/1975 | Pond | B64D 39/00 244/135 A |
| 4,282,909 | A | * | 8/1981 | Clark | B64D 39/06 141/231 |
| 4,438,793 | A | * | 3/1984 | Brown | B64D 39/06 141/346 |
| 2008/0302916 | A1 | * | 12/2008 | Speer | B64D 39/00 244/135 A |

(Continued)

FOREIGN PATENT DOCUMENTS

EP    2759478    7/2014

OTHER PUBLICATIONS

European Search Report, dated Oct. 21, 2015, priority document.

*Primary Examiner* — Richard R. Green
*Assistant Examiner* — Brady W Frazier
(74) *Attorney, Agent, or Firm* — Greer, Burns & Crain, Ltd.

(57) ABSTRACT

A contact detecting system for an air refueling tanker equipped with an air refueling boom, the system comprising a boom refueling nozzle comprising a valve to allow the exit of fuel, a latch to engage the refueling nozzle, a first contact detecting mechanism configured to transmit a signal when the refueling nozzle is in a contact position, a second contact detecting mechanism configured to detect the position of the latch and to transmit a signal when the latch is latched, and a third contact detecting mechanism configured to detect the position of the valve and to transmit a signal when the valve is open. The system further comprises a computing device configured to receive the signals from the first, second and third contact detecting mechanisms and to provide an output signal of the contact status of the refueling nozzle.

11 Claims, 5 Drawing Sheets

(56) References Cited

U.S. PATENT DOCUMENTS

| | | | |
|---|---|---|---|
| 2011/0168844 A1* | 7/2011 | Lagares Carrasco | B64D 39/06 244/135 A |
| 2012/0305710 A1* | 12/2012 | Fernandez Garcia | B64D 39/06 244/135 A |
| 2013/0161449 A1* | 6/2013 | Marcos Montes | B64D 39/06 244/135 A |
| 2013/0299639 A1* | 11/2013 | Martinez Vazquez | B64D 39/00 244/135 A |
| 2014/0042274 A1* | 2/2014 | Hatcher | B64D 39/00 244/135 A |
| 2014/0203147 A1* | 7/2014 | Barsheshet | B64D 39/04 244/135 A |
| 2014/0358335 A1* | 12/2014 | Sanchez Ruiz | B64D 39/00 701/14 |
| 2015/0344147 A1* | 12/2015 | Espinosa Sanchez | B64D 39/06 244/135 A |

* cited by examiner

CONTACT DETECTING SYSTEM AND METHOD FOR AIR REFUELING TANKER EQUIPPED WITH AIR REFUELING BOOM SYSTEM

CROSS-REFERENCES TO RELATED APPLICATIONS

This application claims the benefit of the European patent application No. 15382209.3 filed on Apr. 27, 2015, the entire disclosures of which are incorporated herein by way of reference.

BACKGROUND OF THE INVENTION

One of the methods currently used for operations of refueling and fuel transferring comprises a telescoping tube, which in turn, comprises a fixed part and a mobile part, having the mobile part the capacity to be extended telescopically with respect to the fixed part, carrying out in this mariner the transfer of fuel from the fuel tank of the tanker aircraft to the fuel tank of the receiver aircraft.

For the specific case of the telescoping boom, the operator needs to fly the boom up to introduce the tip of the telescopic boom, usually called nozzle, into the receiver receptacle. Once the nozzle has made contact some latches ensure that the nozzle is engaged into the receptacle. At this specific instant it is essential that automatic systems detect the latching condition to commute from the previous state "no contact/free air" to the "contact/coupled" state.

Indeed, the flight control laws of refueling booms with load alleviation system capability embodied on the aerial refueling boom system itself are different if the boom is in "free air" condition or "coupled" condition. In the first case the flight control laws permit to maintain the boom stable within a predetermine envelope, i.e., the area in which contact with the boom is safe, depending on the flight conditions and action of the air refueling operator on the flight control stick. In the second case, during a contact between tanker and receiver aircraft and "coupled" condition, the flight control laws will aim to reduce and alleviate as much as possible the loads produced by the contact boom—receiver. For that, the air refueling boom system flight control laws will be limited on "accompanying" the movement of nozzle into the receptacle, as this one is moving back-down-up-downwards.

The need to identify the contact status is therefore essential for aerial refueling through the aerial refueling boom system, as the flight control laws could be applied unintentionally but in a proper way and in accordance with its intended function once the nozzle is in contact, but when the "coupled" status is not transmitted properly. Additionally, the contact status is also normally used to manage the fuel pumps of the refueling system.

The actual state of the art uses a unique method to detect the nozzle connection status that is based on an induced signal that transmits an electrical pulse corresponding to the change of status from "not connected" to "connected/coupled," and vice versa. Moreover, once the nozzle is engaged in the receptacle, the nozzle also provides the capability for signal and voice communication between the tanker and receiver aircraft via the mated nozzle and receptacle induction coils and the aircraft's communication systems.

These systems nowadays used in air to air refueling operations are based on the transmission of signals between two induction coils, one located in the boom nozzle and the other one located in the receiver's receptacle. Indeed, when the nozzle is engaged in the receptacle, both coils are aligned, allowing the signal to be transmitted form tanker to receiver aircraft (both signal and voice communications) and vice versa. The receiver aircraft sends the signal of "contact" to tanker aircraft, which change the mode from "free flight/no contact" to "coupled/contact." The transmitted signal comprises a voltage, usually comprised in the range of 7.5 to 30 V, which is then amplified by both tanker and receiver signal amplifiers. This system also has the capability to transmit signals when both coils are not fully aligned, when the nozzle assembly is inserted and the nozzle and receptacle coils are rotated (generally up to 15 degrees, either clockwise or counterclockwise, relative to each other) and separated by a maximum air gap.

From the tanker perspective, the latches of the nozzle are by default in a mechanically locked configuration which provides a rigid attachment point for the engagement of receptacle toggle latches. An independent disconnect system equipping some nozzles permits a command for the disconnection from the tanker side, by releasing the force applied to the latches and permitting the nozzle to be extracted from the receptacle. At the same time, an induced signal is transmitted to the receiver aircraft via an induction coil in order to declare the disconnect status.

From the receiver perspective, the receiver receptacle is also equipped with hydraulically commanded latches that apply a force on the latches of the nozzle in order to maintain it in contact position. When the latch valve control is energized, the latch cylinder will move the latch shaft and, therefore, the latches will close, fixing the nozzle. If the tensile strength of the latches is above a determined threshold, the relief valve will crack, relieving the hydraulic pressure in the latch cylinder, retracting, therefore, the latches.

A contact switch is activated when the nozzle is inserted. The nozzle depresses a sliding valve assembly in the receptacle, which, in turn, actuates the contact switch. As the switch is actuated, electrical power is applied to the toggle latch control valve which provides hydraulic power to the toggle latch actuator. The latch switch activation occurs when the toggles close to latch the nozzle into the receptacle. The actuation of the latch switch provides an electrical pulse to the receptacle signal amplifier which advances it to the contact made position. The connect light is then illuminated in the cockpit. Voice communication is allowed through the boom nozzle and the receptacle's induction coil.

On the completion of the refueling, a disconnect signal sent from either the aircraft causes the latch actuator to extend and release the boom nozzle. Disconnect signals are sent to both aircraft to illuminate respective indications. When in disconnect, the receptacle is configured so it cannot again latch the nozzle. In case other contacts were attempted, the universal aerial refueling receptacle slipway installation (UARRSI) can again reset to ready status by a dedicated pushbutton in the cockpit, which actuates directly over the amplifier.

As described above, during a contact or disconnect phase, the main features involved in this process are the induction coil of the nozzle, the induction coil of the receiver, the latches of the nozzle and the latches of the receiver. Unfortunately, several failure scenarios can be identified as will be explained below.

Regarding mechanical failures:

1. In case the nozzle is inserted into the receptacle, but the latch (either tanker or receiver) is failed, the coils will be aligned and the signal "contact/coupled" will be transmitted, while the nozzle will remain uncoupled. This scenario is known as "float out," and has only operational impact on the operation, but no safety impact.

2. In case the nozzle is inserted into the receptacle and is unable to be removed due to receiver latch failure if the tanker is equipped with an independent disconnect system, disconnect can be controlled by the tanker aircraft. If not equipped, there are two backup means for accomplishing disconnection: a relief valve internal to the latch actuator of the receptacle, designed to open at a crack pressure equivalent to a system specified tension load, or a controlling shear section built into the torque shafts. The failure point is controlled to a location, which allows the torque shaft torsion spring to retract the latches for subsequent stiff boom refueling if required.

Regarding electrical failures:

1. If a failure is declared in the amplifier, the override function, which is enabled by a dedicated pushbutton in the cockpit of the receiver aircraft, will de-energize the amplifier and will establish an alternative path to arm the latch valve, so when the nozzle enters, the valve can be energized. In the disconnection, when in normal mode, the latch valve line is de-energized. The disconnection signal can come either from the receiver or the tanker side. In override, the amplifier is disabled, so the disconnection signal can only arise from the receiver side following other way, which will energize a relay that keeps the latch valve de-energized continuously. In nozzle with IDS (independent disconnect system) function, the disconnection can be commanded by tanker.

2. In case the receiver contact pulse fails, the nozzle will be engaged into the receptacle, whereas the tanker aircraft refueling laws will remain as "free flight, no contact." This represents the worst scenario, as the loads on the nozzle will increase significantly. This failure case has not only an operational, but also safety impact on the refueling operation.

As a consequence, it has been explained that the state of the art systems have a lack of reliability while detecting the signal contact/no contact, given the main issue that these existing methods usually have is that the reliability of the pulse reception is very low, as it is based in an induced signal. Moreover, and in case the pulse is correctly transmitted (no failure of coil), it has been seen that the status could be erroneous, as a "contact" status with two coils aligned does not ensure the nozzle is properly inserted and latched into the receptacle.

It is also known from the published U.S. Patent Application US2012/0305710 that a significant approach is made in terms of detecting the contact/no contact condition by adding additional sensors. In particular, this system adds:

A device for detection of the insertion of the nozzle into the receptacle.

A device for detection of the state of the latches of the receptacle.

A device for detection of the state of the latches of the nozzle.

Additionally, that application describes a device that permits the measurement of the displacement of a piston with a ramp to close or open a cutoff valve of the nozzle. The device comprises a proximity sensor attached to the body of the nozzle, and would constitute an additional means of detection of the insertion of nozzle inside the receptacle.

The main advantage of all these devices is that they are all embodied in the tanker side, concretely in the nozzle, and do not require any modification of the receptacle of the receiver. However, their implementation presents several challenges due to the limited physical space inside the nozzle and due to the explosive atmosphere surrounding the nozzle. Moreover, a single device for detection of the state of the latches of the nozzle does not seem to be a fully reliable solution. Indeed, the document indicates that when the independent disconnect system is commanded, the pistons of the nozzle collapse, in order to activate a microswitch. However, experience has revealed that the pistons do not collapse when the independent disconnect system (IDS) is commanded, but are simply released and loosen. As consequence, the signals "IDS activated/nozzle latches free" would not automatically match if they were compared between IDS signal and microswitch signal.

This highlights some lacks in the disclosure presented in US2012/0305710 A1:

The solutions presented, although present evident improvements for contact/no contact condition, might not be easy to implement in the nozzle.

Their reliability would not be ensured, in particular in the case of the microswitch detecting the state of the latches of the nozzle.

SUMMARY OF THE INVENTION

The present invention solves the problem of detecting the full contact and latched position, increasing safety conditions and reliability of the operation.

The contact detecting system object of the invention is suitable for an air refueling tanker equipped with an air refueling boom capable of being introduced into a receptacle of a receiver aircraft, the system comprising a boom refueling nozzle comprising:

a valve configured to allow the exit of fuel to the receiver aircraft, a latch configured to be engaged to the receptacle of the receiver aircraft, a first contact detecting mechanism configured to transmit a positive signal when the refueling nozzle achieves a contact position in the receptacle of the receiver aircraft and a negative signal when the refueling nozzle does not achieve the contact position, a second contact detecting mechanism configured to detect the position of the latch and configured to transmit a positive signal when the latch is in a latched state and negative when the latch is in a not latched state, a third contact detecting mechanism configured to detect the position of the valve and configured to transmit a positive signal when the valve is in an open state and negative when the valve is in a closed state, characterized in that the system further comprises a computing device configured to receive the signals from the first, second and third detecting mechanisms and configured to analyze these signals in combination and to provide an output signal of the contact status of the nozzle to the tanker aircraft.

The invention presented herein provides the following advantages:

Improvements and/or alternative detection mechanisms of the status of the nozzle inside the receptacle (contact/no contact) with respect to the devices presented in the state of the art.

A way of processing the data obtained from each contact detecting mechanism in a combined manner, in order to obtain a fully reliable state of the nozzle inside the receptacle (contact/no contact).

The present invention develops a status detection system that significantly improves the currently used systems, by means of increasing safety conditions and reliability of the operation. Additionally, steps can be taken to record data that will be used to trigger maintenance actions.

The present invention provides information with respect to the basic status contact/not contact in addition to that provided by the legacy systems.

Additionally, the system described herein, although it can be used in existing devices, it does not require the use of devices installed in the receiver aircraft, which represent a great advantage when applying the present invention to existing fleets.

The present invention adds not only the consequence of having several signals indicating the same status, but also takes advantage of the condition in which the signals used do not indicate the same state, leading to the determination of situations today unknown, and avoiding important risks during the air to air refueling operation.

It is also an object of the invention to provide a method for an air refueling tanker equipped with an air refueling boom capable of being introduced into a receptacle of a receiver aircraft, the system comprising a boom refueling nozzle, comprising:

a valve configured to allow the exit of fuel to the receiver aircraft, a latch configured to engage with the receptacle of the receiver aircraft, a first contact detecting mechanism configured to transmit a positive signal when the refueling nozzle achieves a contact position in the receptacle of the receiver aircraft and a negative signal when the refueling nozzle does not achieve this contact position, a second contact detecting mechanism configured to detect the position of the latch and configured to transmit a positive signal when the latch is in a latched state and a negative signal when the latch is not in a latched state, a third contact detecting mechanism configured to detect the position of the valve and configured to transmit a positive signal when the valve is in an open state and a negative signal when the valve is in a closed state, characterized in that the method comprises the following steps:

reading and transmitting a signal from the first contact detecting mechanism when the refueling nozzle achieves a contact position in the receptacle of the receiver aircraft, reading and transmitting a signal from a second contact detecting mechanism for detecting the position of the latch, reading and transmitting a signal from a third contact detecting mechanism for detecting the position of the valve, receiving these signals into a computing device, the computing device analyzing the signals in combination and providing an output signal to the tanker aircraft of the contact status of the nozzle.

BRIEF DESCRIPTION OF THE DRAWINGS

To complete the description and in order to provide for a better understanding of the invention, a set of drawings is provided. The drawings form an integral part of the description and illustrate preferred embodiments of the invention. The drawings comprise the following figures.

DETAILED DESCRIPTION OF THE PREFERRED EMBODIMENTS

Figure 1:
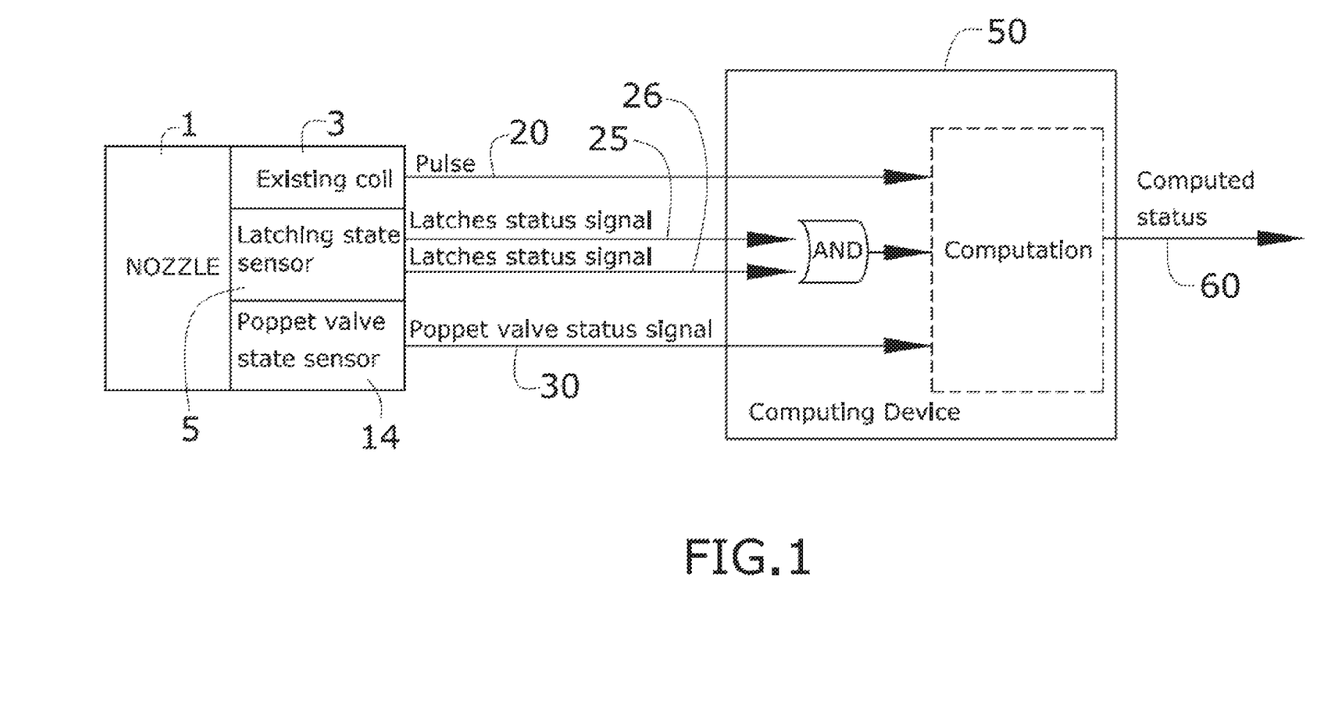
FIG. 1 shows a block diagram according to an embodiment of the invention.

FIG. 1 represents a block diagram of an embodiment of the invention. The nozzle (1) is equipped with the three contact detection mechanisms (3, 5, 14) that are configured to transmit first, second and third signals (20, 25, 26, 30) respectively to the computing device (50). The computing device (50) is configured to compute the combined information and to provide an output signal (60) comprising the connect status of the nozzle (1). The computed status will be either contact or no contact.

The computing device (50) of the embodiment, digital or analog computer, is remotely located from the boom nozzle (1), based on wiring logic, receiving the signals (20, 25, 26, 30) from the contact detection mechanisms (3, 5, 14) implemented into the nozzle (1). The computing device (50) will receive and process these signals (20, 25, 26, 30) in combination, and will provide an output computed signal (60) of "Nozzle Contact Status" to the rest of tanker aircraft systems and hence to the boom operator. Therefore, real time information is provided to the tanker aircraft or to the boom operator about the status of the system.

Figure 2:
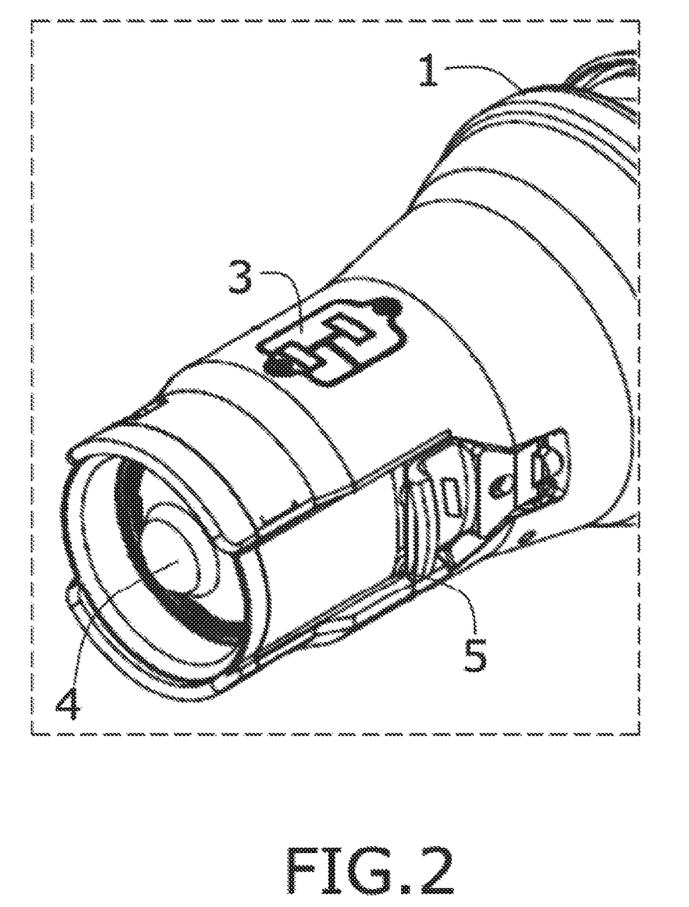
FIG. 2 shows a perspective view of a boom refueling nozzle according to an embodiment of the invention.
Figure 3A:
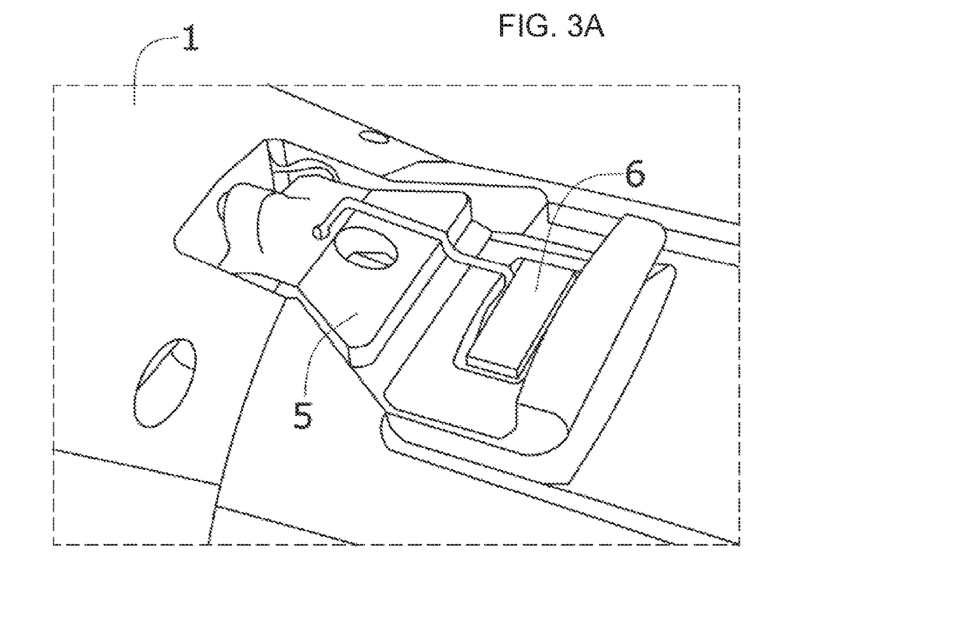
FIGS. 3A and 3B show a perspective view of an embodiment of a contact detection mechanism located in a latch of the nozzle.
Figure 3B:
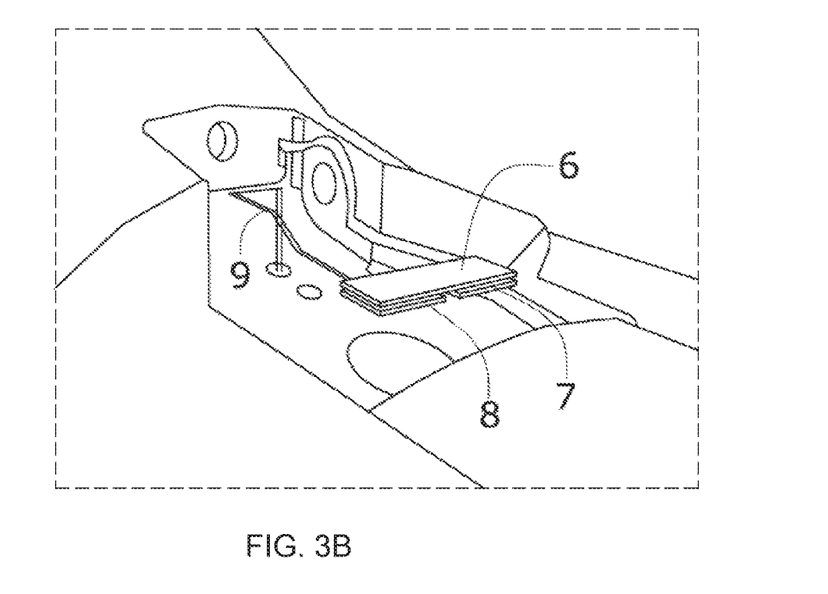
Figure 4:
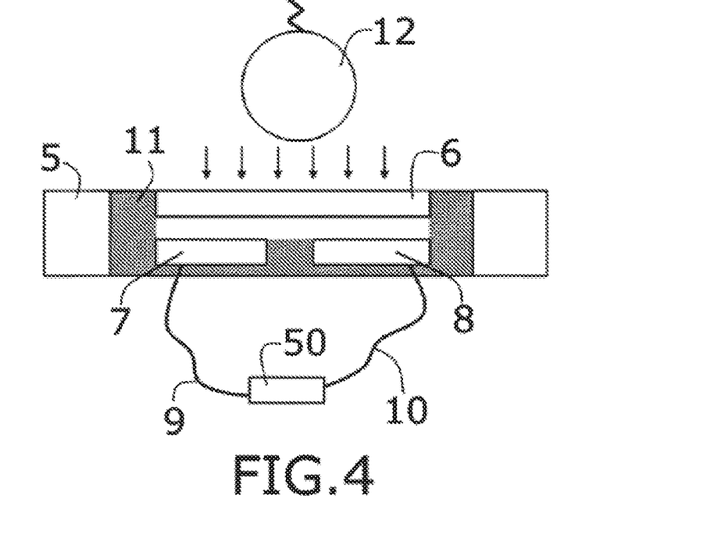
FIG. 4 shows the embodiment of the contact detection mechanism located in a latch of the nozzle in a no contact position.
Figure 5:
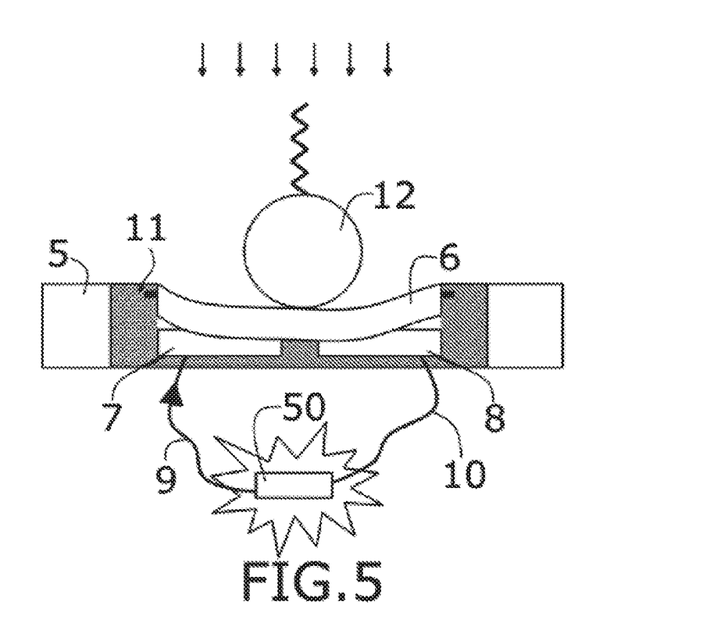
FIG. 5 shows the embodiment of the contact detection mechanism in a latch of the nozzle of FIG. 4 in a contact position.

As shown in FIG. 2, the end of the tube or nozzle (1) comprises some latches (5). On the other side, the receptacle of the receiver aircraft comprises some triggers (not represented), normally activated by hydraulic mechanisms, the triggers having the purposes of attaching and blocking the nozzle (1) of the telescoping tube by means of the clamps on the tube. Once the nozzle (1) makes contact and connects to the receptacle, the boomer may commence the transfer of fuel from the tanker aircraft to the receiver aircraft in a safe manner One embodiment of the invention comprises a system comprising a boom refueling nozzle (1) provided with:

An induced coil (3) which transmits a pulse signal (20) when the nozzle (1) achieves the contact position.

One or more contact detection mechanisms implemented in the latches (5) of the nozzle (1). In the depicted embodiment, one contact detection mechanism will be implemented on each of the two latches (5).

FIGS. 3A, 3B, 4 and 5 disclose an embodiment of the contact detection mechanism for the latches (5) that will detect the contact of a roller (12) of the receptacle onto the latch (5), and, as consequence, will indicate that the nozzle (1) is inserted and secured into the receptacle.

The contact detection mechanism of the shown embodiment comprises two plaques (7) and (8), isolated from one another and isolated from the nozzle body (1). An isolating material (11) surrounds the two plaques (7, 8) for that purpose. A third plaque (6) is located apart from and above them, not in contact with them in the "nozzle no contact" condition. The third plaque (6) is additionally isolated from the nozzle body (1). This third plaque (6) will be directly in contact with the rollers (12) of the receptacle. Two cables (9) and (10) connect the first and second plaques (7, 8), respectively and independently, to the computing device (50) that will analyze the information (pulse, voltage, mA) received.

The resulting signals (25, 26) sent to computing device (50) will be for the first and for the second latch (5).

When the nozzle (1) is inserted into the receptacle, the rollers (12) of the receptacle will be in contact with the latches (5) of the nozzle (1), and as a consequence, directly with the third plaque (6). The rollers (12) will exert a force on the latches (5) in order to maintain the nozzle (1) secured within the receptacle. As the rollers (12) are in contact with the latches (5), they will exert a force on the third plaque (6), and this third plaque will then be moved into contact simultaneously with the first and second plaques (7, 8), allowing thus continuity successively between the computing device (50), cable (9) connected to the first plaque (7), the third plaque (6), the second plaque (8), cable (10) connected to the second plaque (8) and finally to the computing device (50). This represents a "closed circuit." As a consequence, this device will actuate as a switch. A current will be circulating in that circuit, allowing the computing device (50) to consider the circuit as closed, and therefore the nozzle (1) as in "contact" position with the receptacle. Once the nozzle (1) is removed from the receptacle, the rollers (12) no longer exert any force on the latches (5) and the third plaque (6), so that the first and second plaques (7, 8) will no longer be in contact with the third plaque. The circuit will be "open," no current will be circulating, and the computing device (50) will consider the nozzle as "not in contact."

Figure 6:
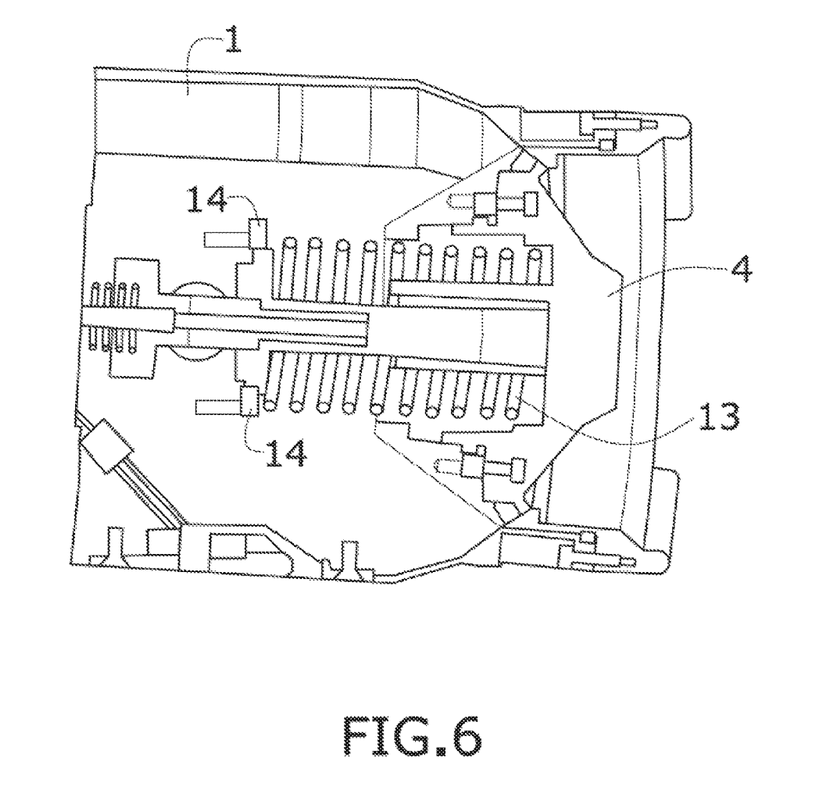
FIG. 6 shows an embodiment of the contact detection mechanism located in the valve of the nozzle.

One or more contact detection mechanisms (14) detect the poppet valve (4) state.

In the embodiment shown in FIG. 6 there is shown a load cell (14) that will measure the force of the poppet spring (13) and determine the position of the nozzle (1) within the receptacle, until it is fully inserted and secured. The resulting signal (30) will be transmitted to the computing device (50) through dedicated wiring.

When the nozzle (1) is inserted into the receptacle, the poppet valve (4), which is a mobile part equipped with a spring (13), will be in contact with a fixed part of the receptacle. The poppet valve (4) will then open, and the spring (13) will be compressed, exerting a force on the load cell (14) on which the spring is seated. When the nozzle (1) is fully inserted into the receptacle and secured by the latches (5), the poppet valve (4) is opened and its displacement is the maximum, as well as the force exerted by the spring (13) on the load cell (14). From now on the maximum displacement will be called "Xmax" and the maximum force exerting by the spring will be called "Fmax." The signal (30) from this load cell (14) will be transmitted to the computing device (50), which will detect a "contact" status of the nozzle (1) into the receptacle when the force read reaches a threshold, the threshold being equal or close to Fmax (to be determined by experimental testing). As soon as the nozzle (1) is removed from the receptacle, the poppet valve (4) will travel in the opposite direction, will leave the Xmax position and the spring (13) tension will decrease from Fmax. As consequence, the load cell will read a lower force, transmitted to computing device (50), which will declare a "no contact" status.

The resulting "contact" signal (30) from the poppet valve (4) will be processed by the computing device (50) in combination with the rest of the signals.

The computing device (50) will firstly analyze the signals (25, 26) coming from the "latching state sensors" (25, 26) that will be voted in order to obtain the latched status in the following way:

If both signals from the latching state sensors (25, 26) are positive the latched status will be positive (latched).

If one or more of the signals from the latching state sensors (25, 26) are negative the latched status will be negative.

Then the computing device (50) will analyze the signal (20) from the first contact detecting mechanism, the latched status and the signal (30) from the valve (4) in accordance with the following table to produce the computed status (60):

TABLE 1

Computed status after receiving the signals.

| Contact of the nozzle (20) | Latched status | Valve status (30) | Computed status (60) |
|---|---|---|---|
| Positive (Pulse received) | Positive (latched) | Positive (Poppet valve open) | [60.1]: Positive/Contact Nozzle connected nominal condition. |
| | | Negative (Poppet valve closed) | [60.2]: Positive/Contact Nozzle connected. Poppet valve shall be open and the signal status [30] is considered failed. Maintenance action shall be done after the flight to restore the signal [30]. |
| | Negative (unlatched) | Positive (Poppet valve open) | [60.3]: Negative/No contact The nozzle is in the nominal position of connection and the poppet valve is fully open, but the latches cannot be latched. Therefore, a possible float out can occur. Although the refueling operation can be performed, additional precautions shall be taken by the boom operator. After the flight a maintenance action will be done to restore the system. |
| | | Negative (Poppet valve closed) | [60.4]: Negative/No contact The nozzle is in a position close to the nominal contact, however, the contact shall be aborted and new attempt shall be tried as a latching condition is not confirmed. |
| Negative (Pulse not received) | Positive (latched) | Positive (Poppet valve open) | [60.5]: Positive/Contact This is considered a loss of pulse signal, but the other signals are indicating that the contact is done. Operation can be done. |
| | | Negative (Poppet valve closed) | [60.6]: Negative/No contact High probability of jammed nozzle. Emergency disconnection shall be done. |
| | Negative (unlatched) | Positive (Poppet valve open) | [60.7]: Negative/No contact The nozzle is in the nominal position of connection but the latches cannot be latched. Therefore, a high probable float out can occur. Although the refueling operation can be performed, additional precautions shall be taken by the boom operator. After the flight a maintenance action will be done to restore the system |
| | | Negative (Poppet valve closed) | [60.8] Negative/No contact Nominal no contact situation. |

Table 1 identifies eight computed states which significantly improves the two states that the currently used systems can only discriminate.

Therefore, there are output signals (60) to the tanker aircraft for aborting the refueling operation when the received signal from the third contact detecting mechanism are negative and at least the received signal between the first or the second contact detecting mechanisms are also negative.

One of the advantages of the invention is that if the signals from the contact detecting mechanisms related to the latches (5) and the valve (4) are positive but the pulse coming from the coil (3) is negative, the computing device (50) will identify a failure in capturing the pulse but the contact status can be declared based on the rest of the contact detecting mechanisms. This way the system can transition from no-contact to contact, allowing the dispense operation in a safe condition. In the existing systems when the pulse is lost but the contact is really done, this would lead to an unsafe condition as the boom control system has wrong information, and the control laws cannot be adapted accordingly. Therefore, the present invention provides higher level of safety.

Another advantage of the invention can be observed when the contact detection mechanisms related to the latches (5) provide a negative signal while the pulse received from the coil (3) is positive. In this case the output signal (60) can be used to advise the crew and/or the control system of a potential float out condition, giving the opportunity to make corrective actions, while the existing systems will consider this situation as a nominal contact. Therefore, the present invention increases the safety level of the refueling system.

Another further advantage of the invention, which is not solved by any of the prior art documents, can be observed in the states in which the pulse and latch (5) signals are positive while the valve (4) signal is negative and the state in which the pulse and latch (5) signal are negative and the valve (4) signal is positive. With these states relevant information for diagnosis of the failure can be recorded, reducing the time of the subsequent maintenance actions, which in turn, reduce the maintenance costs.

In this circumstance the tanker operator applies a protocol allowing the refueling operation but being prepared to react if the nozzle suddenly disconnects.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A contact detecting system for an air refueling tanker equipped with an air refueling boom configured to be introduced into a receptacle of a receiver aircraft, the system comprising a boom refueling nozzle comprising:
   a valve configured to allow the exit of fuel to the receiver aircraft,
   a latch configured to engage the refueling nozzle to the receptacle of the receiver aircraft,
   a first contact detecting mechanism configured to transmit a positive signal when the refueling nozzle achieves a contact position in the receptacle of the receiver aircraft and a negative signal when the refueling nozzle does not achieve the contact position,
   a second contact detecting mechanism configured to detect a status of the latch and configured to transmit a positive signal when the latch is in a latched status and negative when the latch is in a not latched status,
   a third contact detecting mechanism configured to detect a position of the valve and configured to transmit a positive signal when the valve is in an open state and negative when the valve is in a closed state,
   wherein the system further comprises a computing device which receives the signals from each of the first, second and third contact detecting mechanisms and analyzes the signals in combination and provides an output signal of the contact status of the refueling nozzle to the tanker aircraft.

2. The contact detecting system according to claim 1, wherein the computing device is configured to generate an output signal to the tanker aircraft for aborting the refueling operation when the received signal from the third contact detecting mechanism is negative and at least the received signal from the first or the second contact detecting mechanism is also negative.

3. The contact detecting system according to claim 1, further comprising a recording device for recording the analyzed data.

4. The contact detecting system according to claim 1, wherein the computing device is configured to provide an output signal triggering a maintenance signal when the received signal from the third contact detecting mechanism is positive and at least the received signal from the second or the first detecting mechanism is negative.

5. The contact detecting system according to claim 1, wherein the computing device is configured to provide an output signal triggering a maintenance signal when the received signal from the third contact detecting mechanism is negative and the received signal from the second contact detecting mechanism and the received signal from the second and the first contact detecting mechanisms are positive.

6. The contact detecting system, according to claim 1, wherein the first contact detecting mechanism comprises an induced coil configured to transmit the positive signal when the refueling nozzle achieves a contact position.

7. The contact detecting system, according to claim 1, further comprising two latches and two contact detecting mechanisms each for latch, the computing device being configured for firstly analyzing the signals coming from each latch in the following way:
   if both signals from the latches are positive, the latches status will be positive (latched),
   if one or more of the signals from the latches are negative the latches status will be negative.

8. The contact detecting system, according to claim 1, wherein the second contact detecting mechanism comprises:
   two plaques isolated between each other and isolated from the nozzle,
   a third plaque located apart from the two plaques and isolated from the nozzle, which third plaque is configured to not be in contact with the two plaques if the latch is not in a latched state and for being in contact with the two plaques if the latch is in a latched state,
   a first and a second cable connecting respectively each two plaques with the computing device, the two plaques, the third plaque, the first and second cable and the computing device being configured such that when the plaques are in contact there is continuity between the computing device, the cable connected to the first plaque and the third plaque, the second plaque, the cable connected to the second plaque and finally to the computing device.

9. The contact detecting system, according to claim 1, wherein the third contact detecting mechanism comprises a load cell configured to measure a force exerted by a spring configured to be compressed when the valve is in an open position.

10. A refueling tanker aircraft comprising a contact detecting system for the air refueling tanker equipped with an air refueling boom configured to be introduced into a receptacle of a receiver aircraft, the contact detecting system comprising a boom refueling nozzle comprising:
   a valve configured to allow the exit of fuel to the receiver aircraft,
   a latch configured to engage the refueling nozzle to the receptacle of the receiver aircraft,
   a first contact detecting mechanism configured to transmit a positive signal when the refueling nozzle achieves a contact position in the receptacle of the receiver aircraft and a negative signal when the refueling nozzle does not achieve the contact position,
   a second contact detecting mechanism configured to detect a position of the latch and configured to transmit a positive signal when the latch is in a latched status and negative when the latch is in a not latched status,
   a third contact detecting mechanism configured to detect a position of the valve and configured to transmit a positive signal when the valve is in an open state and negative when the valve is in a closed state,
   wherein the system further comprises a computing device which receives the signals from each of the first, second and third contact detecting mechanisms and analyzes the signals in combination and provides an output signal of the contact status of the refueling nozzle to the tanker aircraft.

11. A contact detecting method for an air refueling tanker equipped with an air refueling boom capable of being introduced into a receptacle of a receiver aircraft, wherein a boom refueling nozzle comprises a valve configured to allow an exit of fuel to the receiver aircraft, a latch configured to engage to the receptacle of the receiver aircraft, a first contact detecting mechanism configured to transmit a positive signal when the refueling nozzle achieves a contact position in the receptacle of the receiver aircraft and a negative signal when the refueling nozzle does not achieve the contact position, a second contact detecting mechanism configured to detect a position of the latch and configured to transmit a positive signal when the latch is in a latched state and a negative signal when the latch is not in a latched state, a third contact detecting mechanism configured to detect the position of the valve and configured to transmit a positive signal when the valve is in an open state and a negative signal when the valve is in a closed state, the contact detecting method comprises the following steps:
   reading and transmitting a signal from the first contact detecting mechanism when the refueling nozzle achieves a contact position in the receptacle of the receiver aircraft,
   reading and transmitting a signal from the second contact detecting mechanism detecting the position of the latch,
   reading and transmitting a signal from the third contact detecting mechanism detecting the position of the valve,
   receiving the signals by a computing device,
   analyzing the signals by the computing device in combination, and
   providing an output signal from the computing device to the tanker aircraft of the contact status of the nozzle.

* * * * *